United States Patent [19]
Bregolin et al.

[11] Patent Number: 5,102,492
[45] Date of Patent: Apr. 7, 1992

[54] APPARATUS FOR EFFECTING POLYMERIZATION BY HEATING OF ADHESIVE INTERPOSED BETWEEN TWO SUPERIMPOSED CONNECTED ELEMENTS

[75] Inventors: Amedeo Bregolin; Giuseppe Capello; Marco Guassone, all of Turin, Italy

[73] Assignee: Comau S.P.A., Grugliasco, Italy

[21] Appl. No.: 532,373

[22] Filed: Jun. 4, 1990

[30] Foreign Application Priority Data

Jun. 9, 1989 [IT] Italy .................................. 67456 A/89

[51] Int. Cl.$^5$ ............................................ B30B 15/34
[52] U.S. Cl. .................... 156/583.6; 156/359; 156/583.7; 219/243; 425/407; 100/93 P
[58] Field of Search ............... 156/274.8, 275.3, 380.6, 156/379.8, 380.3, 380.4, 380.5, 386.8, 274.4, 583.4, 583.1, 583.7, 583.6, 583.9, 583.91, 359; 219/243; 425/407; 100/93 P

[56] References Cited

U.S. PATENT DOCUMENTS

| | | | |
|---|---|---|---|
| 3,454,443 | 7/1969 | Zafiroglu | 156/287 |
| 3,738,898 | 6/1973 | Lowe et al. | 156/583.7 |
| 4,443,288 | 4/1984 | Sawada et al. | 156/304.6 |
| 4,659,323 | 4/1987 | Ito et al. | 493/457 |
| 4,761,533 | 8/1988 | Naruse et al. | 219/87 |
| 4,889,967 | 12/1989 | Iida et al. | 219/87 |

Primary Examiner—Michael W. Ball
Assistant Examiner—Francis J. Lorin
Attorney, Agent, or Firm—Klauber & Jackson

[57] ABSTRACT

A method and apparatus is described for polymerization of adhesive interposed between two superimposed elements, in particular the outer and inner plastics material panels of a motor vehicle body door element; two superimposed elements are clamped, around respective portions thereof between which an adhesive substance is interposed, between respective regions of a mould and a presser device which match the profile of the said portions and are provided with internal heating devices; the heating regions of the mould are rigidly supported thereby whilst the heating regions of the presser device are defined by rods which are independently axially slidable against the action of resilient biasing means; the presser device is compressed with a predetermined pressure against the mould and, simultaneously, heat is introduced in a differentiated manner from region to region by the internal heating devices.

9 Claims, 3 Drawing Sheets

APPARATUS FOR EFFECTING POLYMERIZATION BY HEATING OF ADHESIVE INTERPOSED BETWEEN TWO SUPERIMPOSED CONNECTED ELEMENTS

BACKGROUND OF THE INVENTION

The present invention relates to apparatus for effecting, by the application of heat and pressure the polymerisation of an adhesive substance interposed between respective facing superimposed portions of respective superimposed connected mechanical elements, typically the internal and external panels of parts of motor body doors made of thermo setting plastics material. The invention further relates to a method for polymerisation of adhesive substances for the purpose of mutually fixing two superimposed connected elements, which can be performed with the said apparatus.

It is known that parts of motor vehicle doors made of plastics material, for example the tail gate or doors of motor vehicles, are obtained by superimposing and fixing together two (or more) shaped elements obtained by moulding and constituting the internal panel and the external panel of the door element; this fixing, in particular in the case of composite panels made of thermosetting resin and/or other resins, is effected by gluing them together, there being a continuous bead (or spots) of an adhesive substance spread along the junction edges between the panels, then superimposing these, and finally effecting polymerisation (with consequent achievement of the connection) of the adhesive substance. This polymerisation is generally obtained by the simultaneous action of heat and pressure; the heat serves to accelerate the process of cross-linking the adhesive; the pressure serves to maintain the glued edges adherent to one another until the adhesive has taken grip.

The pressure and the heat necessary for polymerisation are currently provided by clamping the elements to be fixed, already coupled and with the adhesive interposed between them, between two moulds usually made of plastics material and one of which is provided with a weight or with a pressure clamping device and, then, causing the "sandwich" thus formed to pass through a tunnel furnace in which the elements are heated in their entirety to the polymerisation temperature of the adhesive (150°-180° C.) by means of a flow of hot air. This method of proceeding is, however, not free from disadvantages; in the first place the tunnel furnace has large dimensions (more than 20 meters) and a high cost; moreover there is a very high energy consumption due to the considerable heat losses and, above all, to the necessity of having to heat both the elements to be glued as well as the adhesive; finally, the time necessary for the operation is relatively long (nine minutes and more) and this is aggravated by the fact that, after polymerisation, it is necessary to wait for the glued elements to cool (with consequent considerable increase in the cycle time) both to allow manual handling and, above all, to allow the application of electroconductive paints or "primers" necessary to effect the electrostatic painting process subsequent to gluing.

SUMMARY OF THE INVENTION

The object of the invention is that of providing an apparatus and an associated method for effecting polymerisation of the adhesive in a rapid manner with a low expenditure of energy and reduced dimensions.

The said object is achieved by the invention, which relates to apparatus for polymerisation by the application of heat and pressure to an adhesive substance interposed between respective superimposed facing portions of respective superimposed connected mechanical elements, characterised by the fact that it comprises a mould and a presser facing the mould and displaceable against this latter with a predetermined pressure, which in turn include respective facing regions which match the shape of the said facing portions of the mechanical elements and which are provided with internal heating devices; the said heating regions of the mould being rigidly supported thereby, and the heating regions of the presser device being defined by respective blades carried by respective rods axially slidably mounted independently of one another and movable against the action of resilient biasing means.

The invention further relates to a process for effecting polymerisation of an adhesive substance interposed between respective superimposed facing portions of respective superimposed connected mechanical elements, characterised by the fact that it comprises the following steps:

clamping the said facing portions of the elements with the predetermined pressure between respective regions of a mould and a presser device, which match the shape of the said portions and are provided with internal heating devices; the heating regions of the mould being supported rigidly whilst the heating regions of the presser device are supported resiliently independently from one another;

simultaneously to the said clamping step, introducing to the said regions, by means of the said heating devices and in different amounts from region to region, sufficient thermal energy to raise the temperature of the said facing portions of the elements and of the adhesive substance disposed between them to a predetermined temperature; and maintaining the said predetermined temperature for a predetermined time by continuous detection of the value of the temperature of each heating region and regulation of the respective heating device

BRIEF DESCRIPTION OF THE DRAWINGS

For a better understanding of the invention a non-limitative description of an embodiment is now given with reference to the attached drawings, in which.

DETAILED DESCRIPTION OF THE INVENTION

Figure 1:
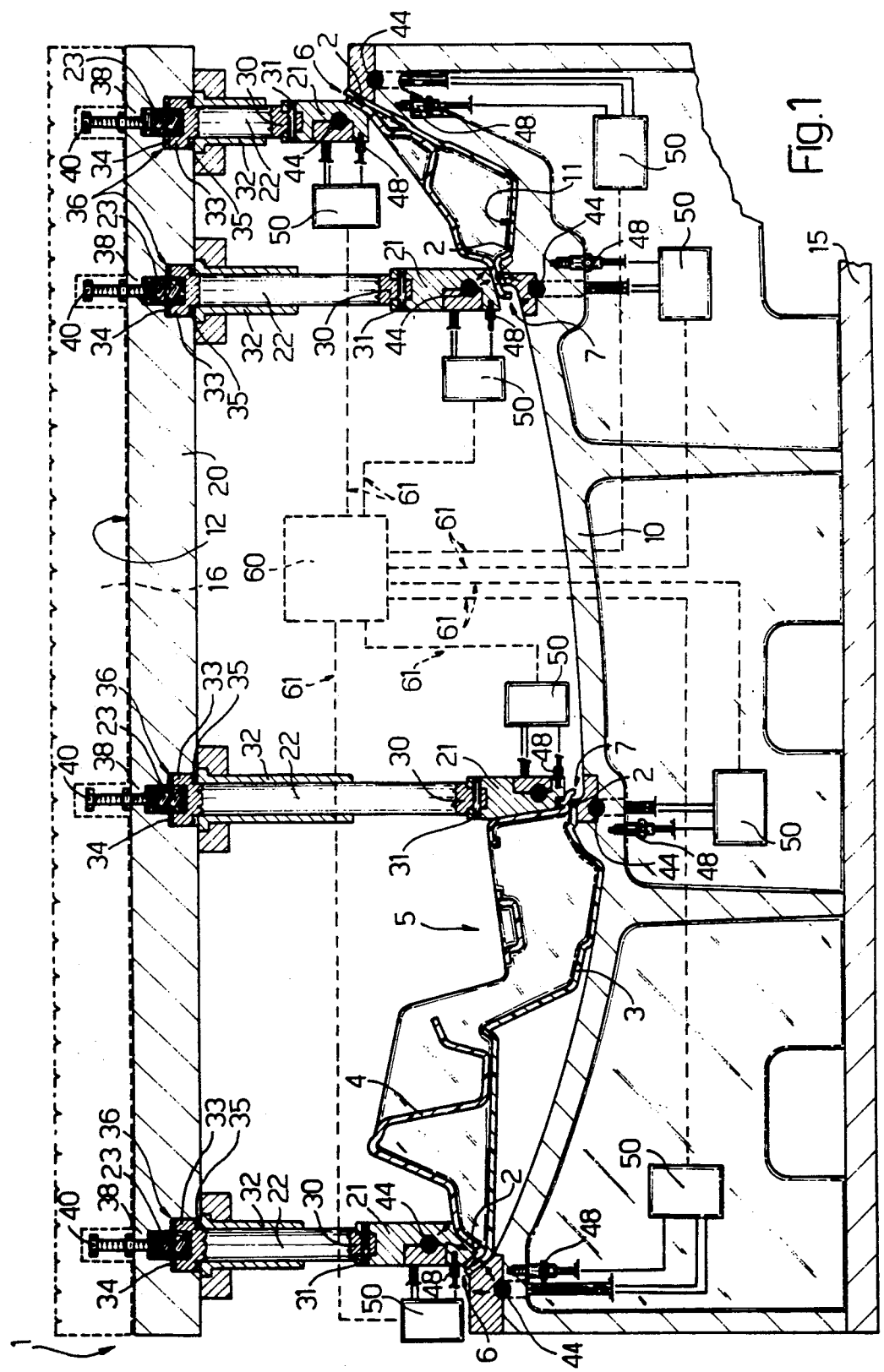
FIG. 1 is a transverse section and side elevation of apparatus according to the invention during a stage in the process forming the subject thereof.

With reference to the attached drawings, the reference numeral 1 generally indicates apparatus for effecting polymerisation by introducing heat and pressure to an adhesive substance 2 interposed between two superimposed connected mechanical elements 3 and 4, in such a way as to cause the stable and permanent connection of the elements themselves to form a single element, in particular a door body element 5 for a vehicle; in the illustrated example the element 5 is a tail gate and the component elements 3, 4 are constituted by respective monolithic panels of complex form obtained in a known way by moulding a thermosetting synthetic plastics resin; these elements 3, 4 are, in a known way, preliminarily joined around their respective opposite peripheral portions 6, 7 by superimposing these facing one another with adhesive substance 2 interposed between them in the form of a continuous or discontinuous bead or, simply, in spots spaced at substantially constant intervals. Then, the two elements thus joined are transported on apparatus 1, manually or with the aid of a robot manipulator of known type, for example provided with gripping pincers adapted to clamp the elements 3, 4, for example at their internal peripheral portions 7, in such a way as to keep them held together during transport.

The apparatus 1 is formed in such a way as to constitute a truly autonomous working station, in the non-limititative illustrated example disposed between the assembly station where the adhesive is deposited and the subsequent painting stations for the finished elements; the apparatus 1 essentially comprises a mould 10 made in a known way of metal material, preferably aluminium, defining the lower part of the apparatus 1 and shaped in such a way as to be able to receive the connected elements 3, 4 laid therein, in the illustrated example provided with a recess 11 shaped like the lower element 3, and a presser device 12 disposed above and facing the mould 10 and displaceable towards this latter in such a way as to be able to clamp the device 12 against the mould 10 with a predetermined pressure value similar to that which would be exerted by a second mould half; the mould 10 is fixedly supported in a replaceable manner on a base 15, whilst the device 12 is fixedly secured to a carriage 16 connected with suitable hydraulic or mechanical drive means and mounted for movement perpendicular to the base 15 along respective guides which are known and not illustrated for simplicity, for example supported by a supporting framework fixed rigidly to the base 15; for example, the base 15 and carriage 16, with the associated supporting framework and the associated drive means may form part of a press of any known type, not illustrated for simplicity, of dimensions adapted to receive the mould 10 and the device 12.

This latter essentially includes a support frame 20 (in the illustrated example defined by a plate provided with suitable lightening holes) secured in any convenient way to the carriage 16, for example by means of four bolts (not illustrated) passing through respective holes 25, and a plurality of blades 21 also made of metal, preferably aluminium, carried transversely below and projecting from respective rods 22, which in turn are carried by the frame 20 on which they are axially slideable independently from one another against the action of resilient biasing means 23. In particular, the blades 21 are shaped and disposed in such a way as to form the annular outline 24 (FIG. 2) suspended from the rods 22 and having a complex profile conjugate with that of the recess 11 or shaped substantially as the portions 6 and 7 of the element 4 in such a way as to define together with the recess 11, when the device 12 is lowered against the mould 10 (FIG. 1) a cavity adapted to house the superimposed elements 3, 4. According to the invention the blades 21 are carried in a removable manner (so as to be interchangeable) each by at least one pair of rods 22, pivoted to a suitably shaped lower end 30 thereof by means of respective removable pins 31. The rods 22 are slidably mounted within respective guide bushes 32 fixedly carried by the frame 20, and each rod 22 has an upper end 33 provided with a pair of opposite front faces constituting respective axial shoulders 34 and 35 housed with predetermined axial play (for example about 3 mm) within a respective seat 36 of the frame 20; the said resilient biasing means 23 are also housed within the seats 36, interposed between the ends 33 and the respective bottom walls 38 of the seats 36; these are constituted in the specific example by respective coil springs the opposite ends of which engage against the ends 33 of the rods 22 and against respective end-of-stroke screws 40, respectively; the screws 40 are each screwed through the bottom wall of a respective seat 36 and serve to vary the apparent rigidity of the springs 23 in comparison with the stoke of the rods 22, in that by screwing them in they progressively compress the springs 23 causing a preload thereon.

Figure 3:
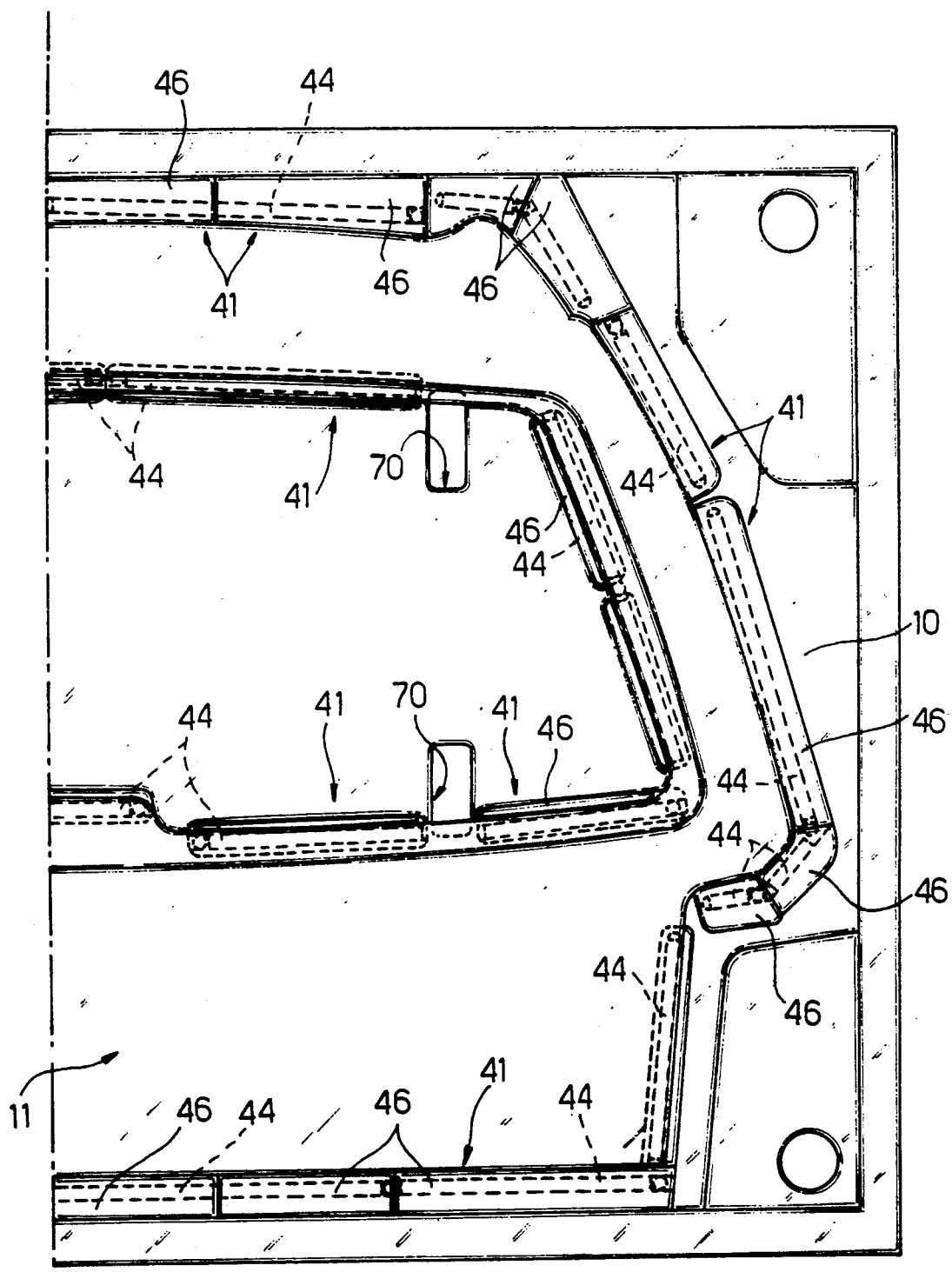
FIG. 3 is a plan view from above of half of a second element of the apparatus FIG. 1, the other half being symmetrical.

According to the invention the device 12 and the mould 10 include respective facing regions which match the shape of the portions 6, 7 of the elements 3, 4 to be joined and which are heated by the fact that they are provided with internal heating devices; the heating regions of the device 12 are defined by the blades 21, whilst the heating regions of the mould 10 are constituted by respective adjacent portions 41 next to the recess 11 (FIG. 3) delimiting the peripheral edges thereof and, therefore, rigidly supported in fixed positions by the mould 10; in the illustrated embodiment the said heating devices are constituted by respective armoured electrical resistances 44, of known type, each of which is housed in a removable manner in a corresponding cavity formed in the respective blade 21 or portion 41; these cavities are closed by respective fixed blocks 46 mounted flush with the opening thereof. Moreover, close to the cavities housing the resistances 44 are disposed respective temperature sensors 48 (for example constituted by thermocouples) adapted to detect the instantaneous temperature of each associated heating region 21, 41.

The electrical resistances 44 and the temperature sensors 48 form part of a "feed back" temperature regulation system based, according to the invention, on a plurality of temperature control elements 50, one for each heating region 21, 41, adapted to maintain each heating region 21, 41 at a predetermined temperature which can be preset for each control element 50 independently of the other elements 50; for example, the elements 50, which essentially function as thermostats, are made with programmable electronic modules based on PLC. Preferably, moreover, the apparatus 1 also includes a central control unit 60, for example a microprocessor, adapted to command the control elements 50 and to which these latter are connected by data lines 61.

Once the elements 3, 4 have been joined with the adhesive 2 interposed between the facing portions 6, 7 they are laid gently onto the mould 10 into the impression 11. For this purpose the mould 10 and device 12 are maintained spaced and the mould 10 is provided, in correspondence with the impression 11, with respective cavities 70 adapted to house the pincers of the possible robot manipulator device for the elements 3, 4 during the operation of the positioning and release thereof. Then the adhesive polymerisation operation is performed by operating as follows.

Figure 2:
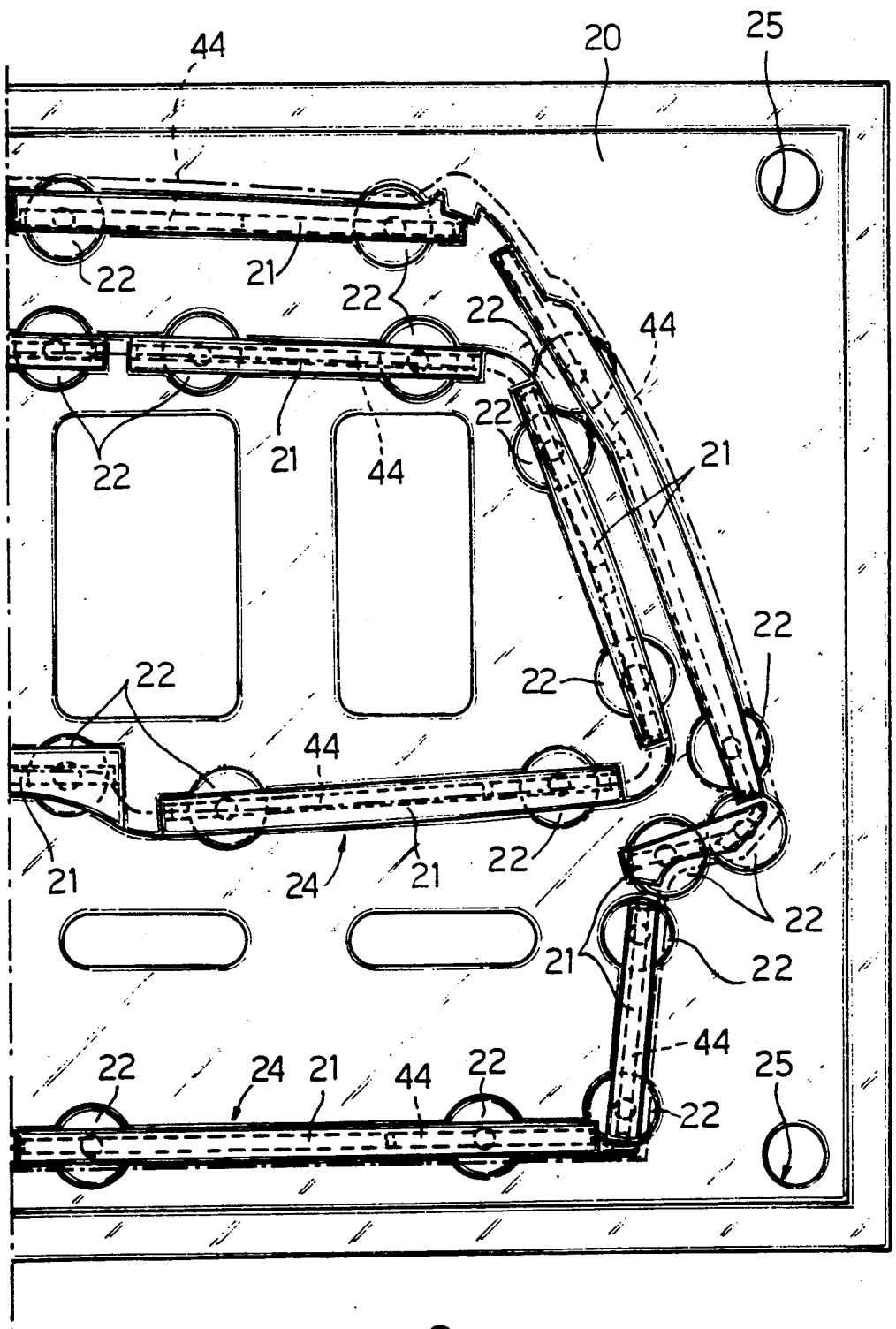
FIG. 2 is a plan view from below of half of a first element of the apparatus of FIG. 1, the remaining half being symmetrical.

First of all the device 12 is caused to approach the mould 10 by making the carriage 20 descend until the peripheral portions 6, 7 of the elements to be joined, between which the adhesive 2 is disposed, are clamped between the blades 21 and the recess 11 (in particular the peripheral portions 41 thereof); the operation of lowering the carriage 20 is stopped as soon as the portions 6, 7 are clamped against the mould 10 with a predetermined pressure value; simultaneously with the clamping stage heat energy is introduced to the regions 21, 41 by means of the resistances 44, in quantities which are different from region to region such as to raise the temperature of the portions 6, 7 of the superimposed elements 3, 4 and of the adhesive substance 2 disposed between them to a predeterminable temperature; in fact, during this stage, the heat produced by the resistances 44 travels by conduction, as illustrated by the arrows in FIG. 1, through the blades 21 and the portions 41, both good conductors of heat being made of aluminium, until they locally heat the portions 6, 7 and pass into the adhesive 2 causing this latter to cross link; during the heating stage the heat produced by the resistances 44 is almost entirely absorbed by the adhesive 2 in that the resistances 44 are disposed very close to the heating regions; the heat which is possibly dispersed into the mass of the elements 3, 4 does not, however, raise the overall temperature of these latter in that it is rapidly dispersed by the remainder of the mould 10 which is also made of aluminium. This heating stage is continued in such a way as to maintain each heating region 21, 41 at a predetermined temperature for a time sufficient for complete polymerisation of the adhesive 2; this time, given the high localisation of the heat, is usual of the order of several minutes (two to three) the maintenance of the desired temperature in each pair of facing regions, 21, 41 is obtained, according to the invention, by continuous detection of the value of the temperature in each heating region 21, 41 effected by means of the sensors 48 and the consequent suitable adjustment of the heat produced by the respective heating device 44, effected by the associated programmable controller 50.

Given the strong localisation of the heat and the rapid dispersion to which the heat not directly absorbed by the adhesive 2 is subjected, which substantially prevents the heat produced by an individual pair of facing regions 21, 41 from significantly altering the temperature of the immediately adjacent pair of regions 21, 41, each section of the portions 6, 7 clamped by an individual pair of heating regions 21, 41 can be maintained, during this stage, at a predetermined temperature different from that of even the adjacent sections; similarly, possible localised dispersions which would tend to cause the temperature of some sections of the portions 6, 7 to fall below the optimum value for polymerisation of the adhesive 2 (150°-180° C.) can be compensated by increasing the flow of heat produced by the resistances 44 in these regions. This heat flow is regulated by the programmable controllers 50 by means of "on-off" type control, obtained by successively switching each resistance 44 on and off or else can be obtained in a more sophisticated manner, for example by varying the supply voltage to the resistances 44 thus obtaining, control of a continuous type. The optimum temperature at which each pair of facing regions 21, 41 between which the portions 6, 7 of the elements to be joined are clamped must be maintained is determined, for each type of elements 3, 4, experimentally and then set on the controllers 50 which control the resistances 41 of that pair of regions 21, 41. Once the time necessary for polymerisation of the adhesive 2 has passed the resistances 44 are switched off and the device 12 is moved away from the mould 10 releasing the monolithic element 5 which has been formed in the meantime; this is substantially at ambient temperature so that it can be removed manually by an operator without risk of burning (or by a robot) and immediately sent on for the subsequent painting operations.

From what has been described the advantages connected with the invention will be evident; the apparatus 1 is of great constructional simplicity, low cost and of small dimensions; the necessity of using a tunnel oven is eliminated; the cycle time is reduced at least to one quarter of the current value (the operation of polymerisation alone is effected in about three minutes compared with the nine and more necessary in the tunnel oven) and the energy consumption given the reduced mass to heat, is reduced to a fraction of the current value. The finished workpiece is obtained at the end of the operation substantially at ambient temperature (or slightly above) so that it can easily be manipulated without precautions and immediately passed on for painting; finally, with the same apparatus 1 it is possible to treat elements of different shape and type; for this purpose it will be sufficient to replace the mould 10 and the blade 21 which operations can easily and simply be achieved in a short time, and reset the programmable controllers 50 to suitable values. This latter operation is automatically effected by the central control unit 60, when present, for example by introducing thereto a code indicative of the type of elements to be joined.

We claim:

1. Apparatus for polymerization, by the application of heat and pressure, of an adhesive substance interposed between respective superimposed facing portions of respective superimposed mechanical elements, for connecting the superimposed elements to each other, the apparatus comprising:

a mold made of a heat conductive material, said mold being provided with impression means for receiving the superimposed elements to be joined, said mold including heating regions rigidly fixed with the mold in correspondence with the impression means, said regions matching the shape of said superimposed facing portions of said elements to be joined and being internally provided with first heating devices;

a pressure device disposed above and facing the mold, said presser device including a support frame, a plurality of blades disposed in facing relation to said heating regions of said mold and internally provided with second heating devices, and means for slidably connecting said blades, in a manner independently of one another, to said frame against the action of resilient biasing means; and said frame being displaceable towards said mold to clamp with predetermined pressure said superimposed facing portions of said superimposed elements placed within said impression means substantially only between said heating regions of the impression means of said mold and said blades.

2. Apparatus as claimed in claim 1, wherein both said mold and said blades are made of metal, and wherein said blades are disposed and shaped in such a way as to form an annular outline suspended from said frame and having an overall shape conjugate with that of said impression means.

3. Apparatus as claimed in claim 1, wherein said blades are carried transversely below and projecting from respective rods carried by said frame so as to be axially slidable, independently of one another, with respect to the frame, against said resilient biasing means.

4. Apparatus as claimed in claim 3, wherein said blades are removably carried by said rods, each blade being pivotally connected to a first end of at least a pair of said rods by means of respective removable pins.

5. Apparatus as claimed in claim 4, wherein said rods have second ends opposite to said first ends, said second ends being slidably mounted through guide bushes fixedly carried by said frame, said second ends being provided with respective opposite axial shoulders and being housed with a predetermined axial play inside respective seats provided through said frame.

6. Apparatus as claimed in claim 5, wherein said resilient biasing means includes respective coil springs, each housed inside a respective said seat between said second end of the respective rod and an end-of-stroke screw screwed through a corresponding end wall of the seat.

7. Apparatus as claimed in claim 1, wherein said first and second heating devices include respective electrical resistors, each of which is housed in a removable manner inside a cavity provided through the associated heating region of the mold and the associated blade of the presser device respectively, said cavities being closed by associated removable blocks mounted flush with the mouth thereof; and said apparatus further includes temperature sensors provided near said cavities, through said heating regions of the mold and said blades of the presser device, and a plurality of control element means electrically connected to associated temperature sensors and electrical resistors for maintaining a predetermined temperature in each of said heating regions and blades, independently of the temperature reached by the other heating regions and blades.

8. Apparatus according to claim 7, further including central control means for commanding said control element means.

9. Apparatus according to claim 1, wherein said mold and said blades are made of aluminum.

* * * * *